United States Patent [11] 3,621,111

| [72] | Inventor | George K. Danko |
| | | Chesterland, Ohio |
| [21] | Appl. No. | 51,639 |
| [22] | Filed | July 1, 1970 |
| [45] | Patented | Nov. 16, 1971 |
| [73] | Assignee | General Electric Company |

[54] LEAD-IN CONDUCTOR FOR ELECTRICAL DEVICES
2 Claims, 6 Drawing Figs.

[52] U.S. Cl. .................................................. 174/50.64,
313/332
[51] Int. Cl. ..................................................... H01j 5/38
[50] Field of Search ........................................... 174/50.64,
50.61; 313/317, 318, 332 X, 274

[56] References Cited
UNITED STATES PATENTS
3,105,867  10/1903  Meijer .......................... 174/50.64

*Primary Examiner*—Darrell L. Clay
*Attorneys*—James J. Lazna, Frank L. Neuhauser, Oscar B. Waddell and Joseph B. Forman ABSTRACT: A lead-in conductor and method of manufacture for use in electrical devices. The lead-in conductor comprises outer and inner lead wires, a foil and a tab material of a specific melting point such that the tab material melts to form a high-current-carrying joint between the lead wires and the foil.

PATENTED NOV 16 1971

3,621,111

Inventor:
George K. Danko
by James J. Lazna
His Attorney 3,621,111

LEAD-IN CONDUCTOR FOR ELECTRICAL DEVICES

BACKGROUND OF THE INVENTION

1. Field of the Invention

This invention relates generally to electrical devices having lead-in conductors which are hermetically sealed into envelopes of high-silica vitreous material. More particularly the invention relates to lead-in conductors comprising outer and inner leads attached to a thin foil section, which is hermetically sealed in an envelope, and the method and materials for joining the lead wires to the foil portion.

2. Description of the Prior Art

For purposes of convenience, and not by way of limitation, the invention will be described with particular reference to quartz tungsten halogen lamps. In the prior manufacture of lamps using a foil portion lead-in conductor, a tab material, usually of platinum-clad molybdenum, was welded to the foil portion and the lead wire was welded to the tab. The reason for using such tab material is that welding of a tungsten lead wire to a molybdenum foil is difficult. Consequently, a material is selected for a tab which is weldable to both the molybdenum and tungsten.

The usual form of this welding is to spotweld or resistance-weld the tab to the foil thereby forming a joint covering a relatively small circular area or, if more area is desired, to shape the electrode such that the weld joint is rectangular and extends the approximate width of the foil. The lead wire is similarly welded to the tab. This process of welding has limitations as to the size of joint obtainable. An alloying process takes place between the molybdenum foil and the platinum. The alloy created is very brittle and if the weld joint is too extensive the embrittled foil will shatter when the fused silica envelope of a lamp is collapsed around the foil in the subsequent sealing operation. In order to avoid this embrittlement problem, relatively small weld joints are used. This smallness of the weld joint in turn reduces the amount of current conductibility of the lead-in wire assembly.

SUMMARY OF THE INVENTION

Accordingly, an object of this invention is to provide a lead-in conductor assembly which will not shatter when the fused silica envelope is collapsed around it, while still maintaining the advantages of hermetic sealing inherent in the use of a foil. Still another object of the invention is to provide a lead-in conductor which can conduct relatively high currents due to the larger cross-sectional area of the joint between the foil and the lead-in wire. These objects are achieved by selecting a tab material whose melting point closely approximates the softening point of the fused silica envelope. The tab material, lead wire and foil are positioned and lightly tack-welded into a lead-in conductor assembly. Following this the lead-in conductor assembly is hermetically sealed into the envelope at which time the tab material melts and joins the foil and lead wire over a large cross-sectional area.

BRIEF DESCRIPTION OF THE DRAWING

Further features and advantages of the invention will appear from the following detailed description and from the drawings wherein.

DESCRIPTION OF THE PREFERRED EMBODIMENTS

Figure 1:
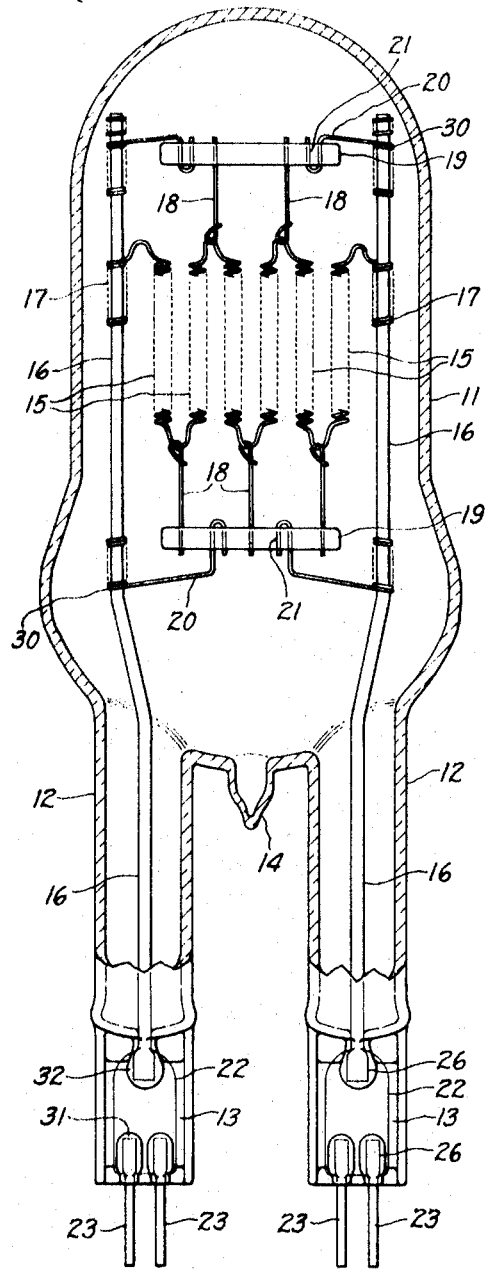
FIG. 1 is a front view of a lamp embodying the invention.

Referring to FIG. 1 of the drawings, a high-wattage quartz halogen lamp is exemplary of one use of the invention and comprises an envelope 11, preferably of essentially fused silica such as quartz, having extended leg portions 12 which have pinch seals or compressed portions 13 to seal the envelope from the atmosphere and a nubbin 14 which is the residue of an exhaust tube. Positioned within the envelope is a planar filament 15 which is connected to lead wire 16 by inserting the lead wires through the outer segments of the planar coil or filament and spot welding as shown at 17. Planar coil 15 is positioned and held by support wires 18 embedded in insulating quartz bridges 19. Bridge support wires 20 are embedded at one end into the quartz bridge as shown at 21 while the lead wires 16 are inserted into the other end of the bridge support wires and spot welded as shown at 30.

Lead wires 16 extend into the envelope leg portion 12 and are attached, in a manner to be presently described, to foils or foliated portions 22. Outer lead wires 23 are similarly attached at the other ends of the foils for connection to an electrical energy supply. Two outer lead wires 23 are attached to each foil 22 for purposes of reducing the current per lead wire and, in turn, the operating temperature of the outer lead wires thus inhibiting foil oxidation. The use of the two outer lead wires is not a necessary part of the invention; however, its use is recommended for a relatively high amperage conductor.

Figure 2:
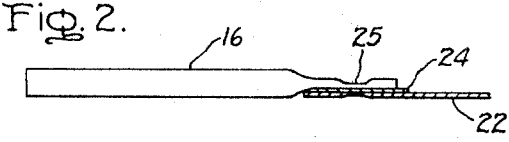
FIG. 2 is a fragmentary side view on an enlarged scale of a weld joint of the prior art.

One of the reasons for lead failures in high-amperage lamps is illustrated in FIG. 2. The inner lead wire 16 is welded to the foil portion 22 by attaching the lead wire to a tab 24, usually of platinum clad molybdenum, which has previously been welded to the molybdenum foil 22. This type of lead attachment limits the current conducting capabilities because of the small cross-sectional area where the parts are joined as illustrated at 25. If additional welding of this type takes place, the molybdenum foil 22 would begin to alloy with the platinum of tab 24 thereby causing an extremely brittle lead combination which would shatter when the softened quartz of the lamp envelope is collapsed onto the foil thereby rendering the electrical connection inoperable.

Figure 3:
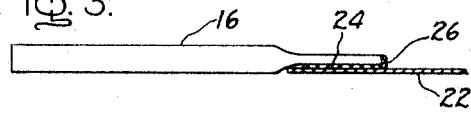
FIG. 3 is a fragmentary side view on an enlarged scale of the joint of the invention.
Figure 6:
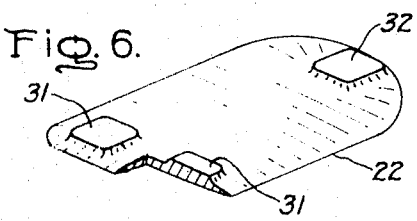
FIG. 6 is an elevation on an enlarged scale of foil used in the invention.

To overcome this deficiency in accordance with the invention, a tab material 24 is selected such that it will melt at the sealing temperature of the envelope and form a uniform joint between molybdenum foil 22 and lead wire 16, as illustrated at 26 in FIG. 3. Before the tab material and lead wires are tack-welded to the foil, the foil 22 is subjected to a selective etching process. As illustrated in FIG. 6, the foil portion 22 is subjected to an etching process, as is customary, over its entire area to provide a feather sealing edge except those areas which will be used to form the electrical and mechanical connection between the foils, tabs and lead wires. Two of these nonetched areas 31 and 32 are shown as elevated pads in FIGS. 1 and 6. This process of foil preparation allows additional material for the conducting of current at the critical juncture. Although this type of foil preparation is not essential to carry out the invention, it is recommended for optimum results.

The type of connection or joint illustrated at 26 in FIG. 3 is achieved by performing the melting process during the pinch seal operation. The outer and inner lead wires 16, 23 are lightly attached to the tab 24 and the foil 22 by one or more tack welds. If this step is overdone such as by resistance-welding over a considerable area, the foil 22 has a tendency to become embrittled thereby preventing an effective seal between the lead-in conductor arrangement and the envelope.

Figure 4:
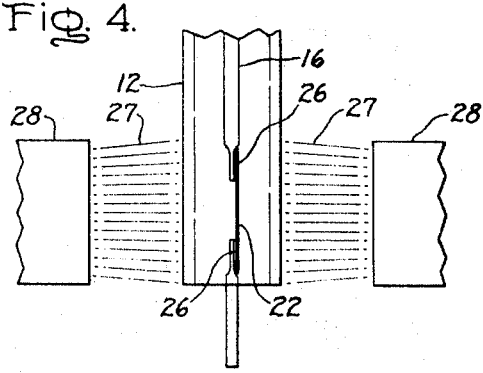
FIG. 4 is a front elevation showing the lead-in conductor assembly in sealing relation to the envelope and the application of heat through fires.
Figure 5:
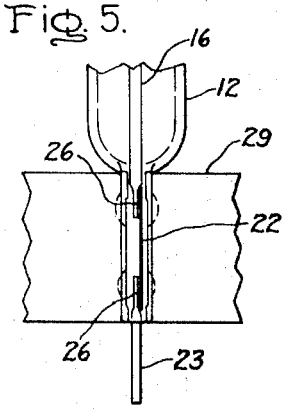
FIG. 5 is a front elevation of the invention as the pinch jaws collapse the bulb wall.

The tack-welded assembly of lead wires, tabs and foils are then inserted into the envelope leg portions 12 and the assembly held in sealing relationship as shown in FIG. 4. Heat is then applied to the envelope leg portions by fires 27 from burners 28. While the envelope leg portions 12 approach their softening point, tab material 24 approaches its melting point. When the proper temperature levels are achieved, pinch jaws 29 not only collapse the envelope to press it into sealing relationship with foil 22 but also squeeze the melting tab material 24 into intimate contact with the foil and lead wires to form the uniform joint illustrated at 26 in FIG. 3. Upon melting, tab material 24 fuses to both the foil and lead wires to form, in effect, a highly conductive and strong soldered joint.

In selecting the appropriate material for the tab 24, attention should also be paid to its oxidizing properties at elevated temperatures, such as 500° C. or above. The combination of 92 percent palladium and 8 percent ruthenium not only has the proper melting properties required by the invention but also has the nonoxidizing characteristic required in this high-amperage application. Other combinations from the family of metals consisting of ruthenium, rhodium, palladium, osmium, iridium, and platinum can be used for the same purpose as the above palladium-ruthenium alloy.

While the preferred embodiment of the invention has been given, it should be understood that it is merely explanatory thereof, and the invention may be widely modified within the terms of the appended claims.

What I claim as new and desire to secure by Letters Patent of the United States is:

1. In an electrical device, a highly conductive high-temperature-resisting and gastight fused silica seal surrounding lead-in conductors comprising, in combination, a thin refractory metal foil section, separate electrical conductors, thin metal tabs fused between and joining said foil and conductors respectively to provide a conductive path through said conductors and foil, a heat-deformed fused silica envelope surrounding and engaging said foil and conductors and being hermetically sealed to said foil, the metal material of said tabs having a melting point approximately the same as the softening point of said silica envelope, said tab material being an alloy whose constituent parts are selected from the group consisting of ruthenium, rhodium, palladium, osmium, iridium and platinum.

2. An electrical device as stated in claim 1 wherein said tab material is 92 percent palladium and 8 percent ruthenium.

* * * * *